March 24, 1953 J. KIRBY 2,632,609
FISHING LINE LEADER REEL
Filed May 12, 1951

JOHN KIRBY
INVENTOR

By Glenn S. Fish
PATENT ATTORNEY

Patented Mar. 24, 1953

2,632,609

UNITED STATES PATENT OFFICE 2,632,609

FISHING LINE LEADER REEL

John Kirby, Spokane, Wash.

Application May 12, 1951, Serial No. 226,036

1 Claim. (Cl. 242—107)

This invention relates to sporting equipment and more particularly to a spring operated fishing line leader reel.

One object of the invention lies in the provision of a leader reel upon which a leader may be wound and stored in a tackle box and thus prevent its becoming entangled with the rest of the tackle.

Another object of the invention lies in the provision of a leader reel, having a casing or housing which encloses a spring operated reel having a hook for attaching one end of a fishing line leader to be wound thereon for storage.

Another object of the invention lies in the provision of a leader reel with a winding knob having a circular rack and a dog to enable one to wind the spring in the event the release button is pressed when the reel is empty and the spring becomes unwound as well as to freely rotate the reel for the purpose of bringing the hook in registry with the peripheral opening of the housing to enable hooking a leader thereto.

Another object of the invention lies in the provision of a rotatable hub which is journaled on one section of the housing and which contains a slot for receiving and securing one end of the reel operating spring.

Another object of the invention lies in the provision of a spring held release button having latches thereon which engage teeth formed on the reel and releasably secure the hub and the reel together.

Other objects will become apparent during the course of the following description.

Figure 1:
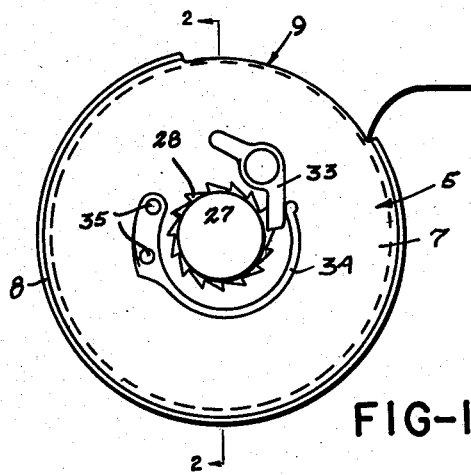

In the accompanying drawing, forming a part of this specification, and in which like numerals are employed to designate like parts, Figure 1 is a side elevation of my leader reel.

Figure 3:
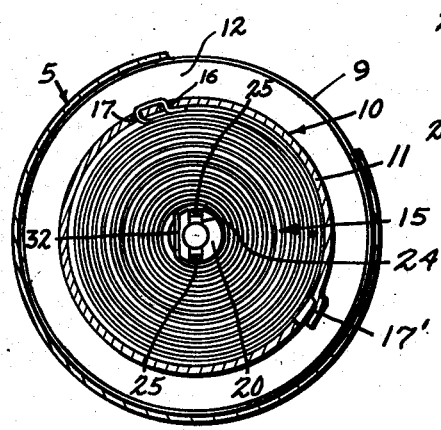
Figure 2:
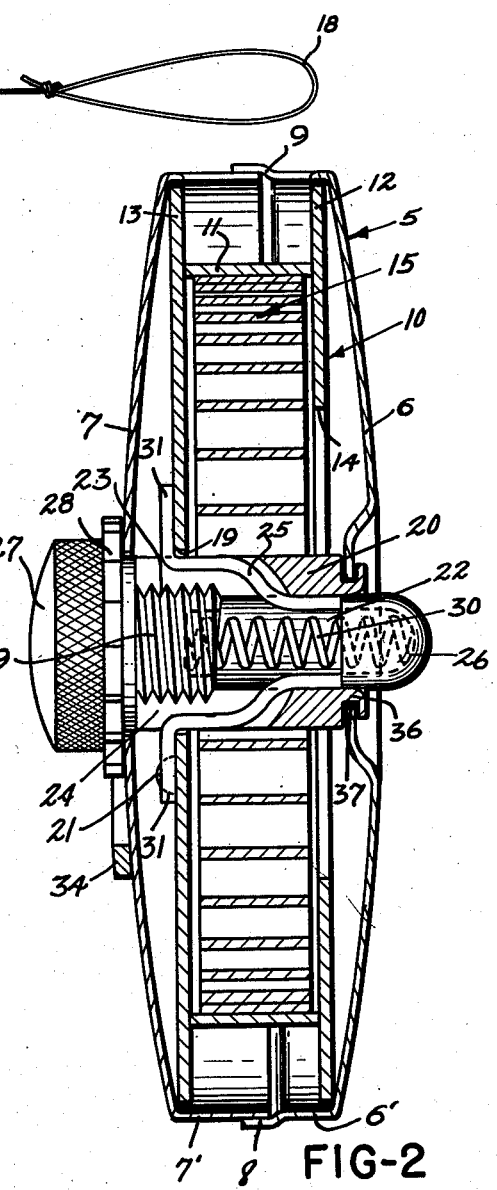
Figure 4:
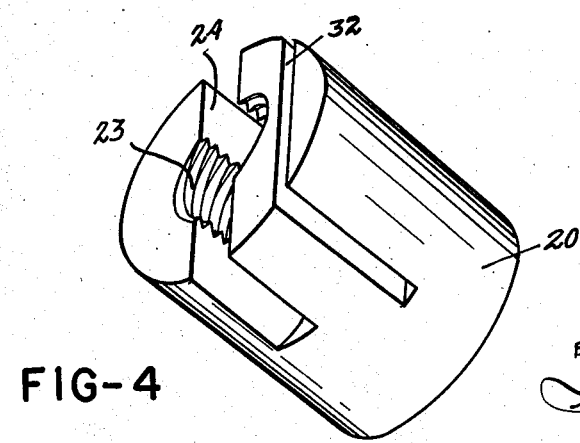

Figure 2 is a vertical cross section taken through the reel as at line 2—2 of Figure 1, Figure 3 is a vertical cross section taken through the reel on a plane at right angles to Fig. 2, and, Figure 4, is a perspective view of the rotatable hub of the reel.

My improved leader reel is provided with a housing 5 formed of two cooperating sections 6 and 7 which join at the transverse peripheral center with inturned rim 7' of section 7 fitting within the peripheral expression 8 of inturned rim 6' on section 6. The adjoining portions of rims 6' and 7' are cut away at 9 to form a peripheral opening in the housing and through which a leader may be attached to and wound upon the reel 10.

The reel 10 is formed of a flat ring 11 disposed between spaced discs 12 and 13 which are of a larger diameter and thus form upstanding walls to confine a leader being wound upon the reel to the peripheral face of the ring 11. Disc 12 is provided with a relatively large central opening 14 which permits leaf spring 15 to be inserted within the reel 10. Ring 11 is provided with two circumferentially spaced transversely positioned slots 16 and 17 and spring 15 is secured at one end to the ring by passing the end thereof outwardly through slot 17 and thence back inwardly through slot 16. A hook 17' is pressed or stamped from the ring to secure an end loop 18 of the leader and as spring 15 rotates the reel, the leader is wound upon the reel.

Disc 13 is also provided with a center opening of lesser size than opening 14 and is indicated by the numeral 19. This opening is to permit passage of hub 20 therethrough and allow the reel to rotate about the hub. A concentric row of spaced teeth 21 are pressed outwardly from disc 13 adjacent the opening 19.

Hub 20 is rotatable within the housing and is journaled on one section of the housing by means of a reduced end portion 36 which is formed on one end thereof and which is placed through the opening 37 of section 6 where it is bent outwardly to form a bearing rim and rotatably secure the hub on the housing section 6. A central bore 22 is provided in the hub 20, and this bore is threaded at 23 for a portion of its length. A kerf 24 is formed across the hub on the diameter and the kerf is cut deeply enough to terminate substantially midway the length of the hub. The kerf 24 is provided to accommodate the spreading arms 25 of release button 26 which protrudes from the open end of the hub 20 apposed to the threaded and kerfed end.

A hand knob 27 is provided with a reduced and threaded portion which cooperates with the threads 23 of the bore 22 securing the knob 27 and hub 20 together. A circular rack 28 is provided about the knob, at its base, and is positioned on the outer face of one housing section 7 where it cooperates with a dog 33 also pivoted on the outer face of the housing section 7. An expansion spring 30 is disposed between the knob 27 and the release button 26 to releasably hold the release button in the reel locking position with the latches 31 or arms 25 disposed in engagement with teeth 21.

The inner end of spring 15 is secured to hub 20 by passing the end through a slot 32 positioned as a chord of the circular hub 20.

Pivotally mounted on the outer face of section 7 is dog 33 which is held by arcuate spring 34 secured to the housing at 35. It will be plainly seen in Figure 1 that one may grasp the knob 27 and rotate the hub 20 and reel 10 clockwise as a unit when the reel is not held by means of a leader or one's finger. The reel may be held as above described and the spring 15 wound by rotating the knob 27.

With the spring 15 wound, a leader loop 18 is hooked over hook 17' and when release button 26 is depressed, reel 10 rotates, winding in the leader, when the leader is sufficiently wound, the release button 26 is returned to its normal position, and the reel is locked against rotation by the energy of spring 15. However, clockwise movement of the knob will cause the reel to turn.

When it is desired to remove the leader for connecting to a fishing line, knob 27 is rotated until the free end of the leader may be grasped and the leader is then pulled from the reel and the opposite end unhooked from the hook 17'.

A hook may be supplied upon the housing to secure the free end of the leader and thus prevent the possibility of it being down in the housing if one so desires.

Having thus described my invention, I desire to secure by Letters Patent and claim:

In a leader reel the combination with a sectional housing having a peripheral opening, a rotatable reel in the housing, teeth on the reel, and a spring secured at one end within the reel, of a rotatable hub in the housing and journaled on one section of said housing, a diametric kerf in the hub, a bore in the hub threaded from the kerfed end of the hub to a point substantially midway its length, a release button in the bore and protruding from the end opposed to the threaded end, spreading arms on said button and in said kerf, opposed latches on the arms for releasably engaging said teeth, whereby the hub and reel may be locked together, a slot in said hub to receive and secure the other end of said spring, a knob having a reduced and threaded end portion threaded in said bore, a circular rack on the knob, an expansion spring in the bore between said knob and said release button, and a spring held dog pivoted to one of the housing sections and engaging said rack.

JOHN KIRBY.

REFERENCES CITED

The following references are of record in the file of this patent:

UNITED STATES PATENTS

| Number | Name | Date |
|---|---|---|
| 1,415,489 | Simpson | May 9, 1922 |
| 1,560,919 | Unruh | Nov. 10, 1925 |
| 2,596,648 | Bugg et al. | May 13, 1952 |

FOREIGN PATENTS

| Number | Country | Date |
|---|---|---|
| 60,512 | Switzerland | June 28, 1912 |
| 373,786 | Great Britain | June 2, 1932 |